March 23, 1948.  H. C. PFISTER  2,438,184
FOOD TENDERING MACHINE
Filed June 16, 1944   4 Sheets-Sheet 1
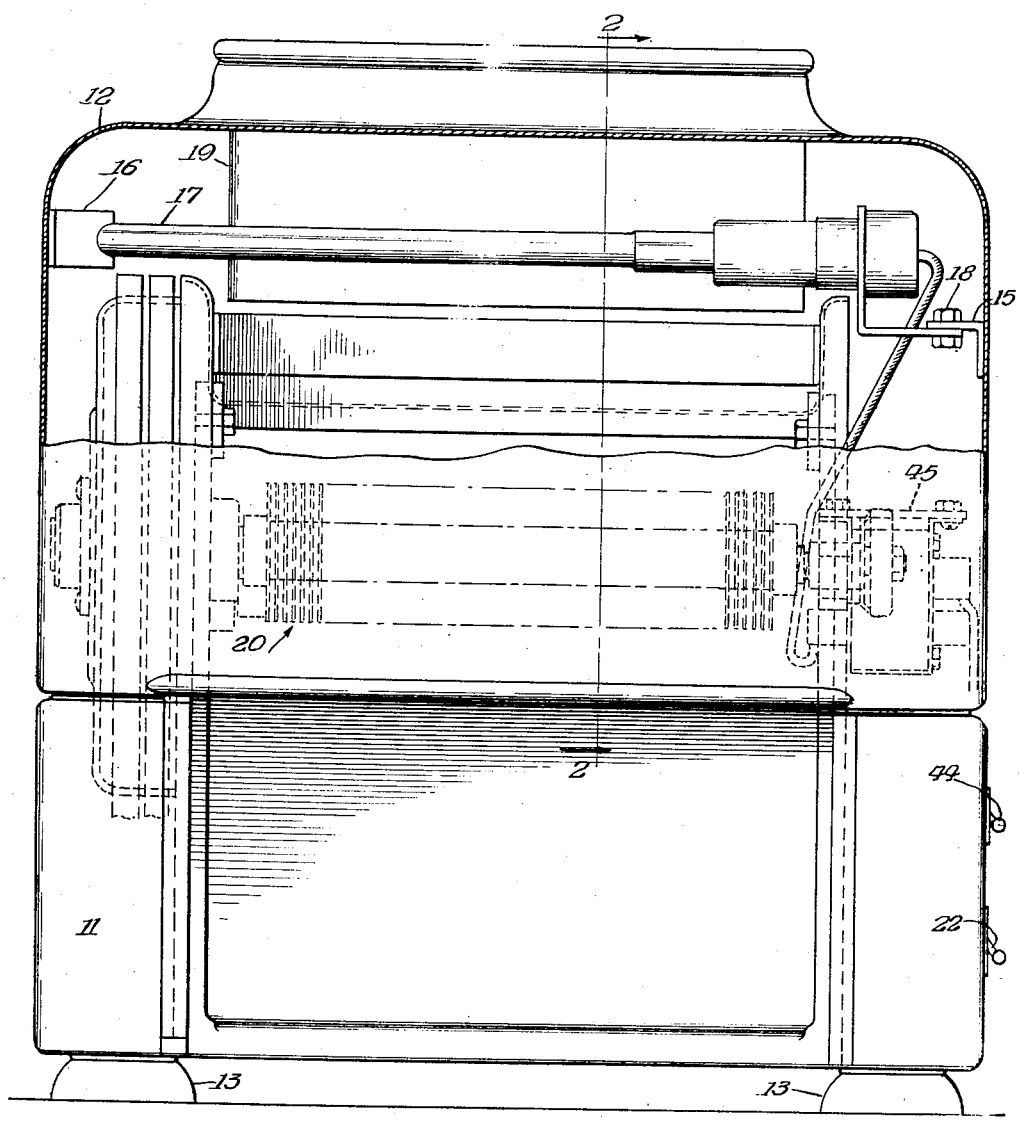
Fig. 1
Fig. 7
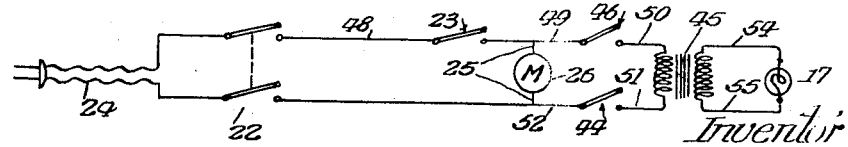
Inventor
Harry C. Pfister
By Spencer, Margall, Johnston & Cook
Attys March 23, 1948. H. C. PFISTER 2,438,184
FOOD TENDERING MACHINE
Filed June 16, 1944 4 Sheets-Sheet 2
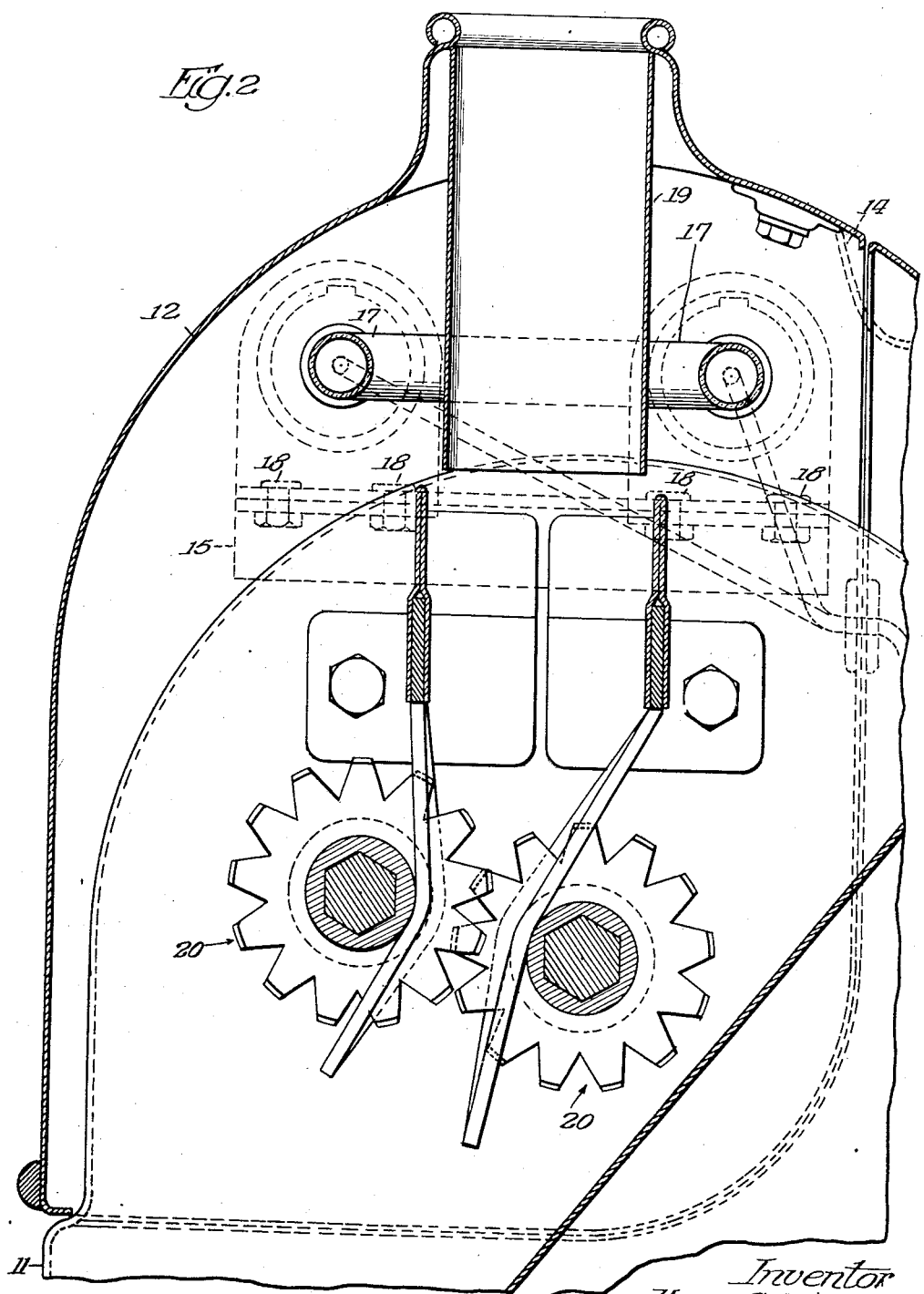

March 23, 1948.   H. C. PFISTER   2,438,184
FOOD TENDERING MACHINE
Filed June 16, 1944   4 Sheets-Sheet 3

Inventor
Harry C. Pfister
By Spencer, Marzall, Johnston & Cook,
Attys

March 23, 1948.　　　H. C. PFISTER　　　2,438,184
FOOD TENDERING MACHINE
Filed June 16, 1944　　　4 Sheets-Sheet 4
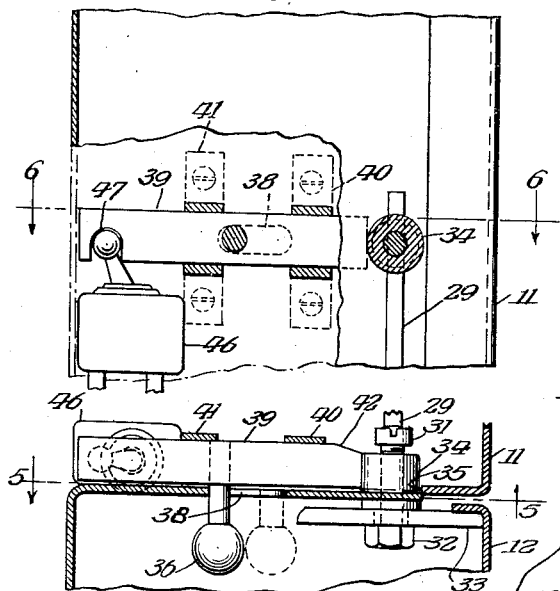
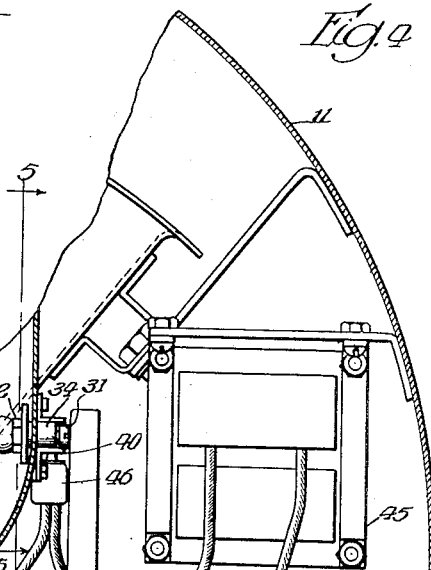
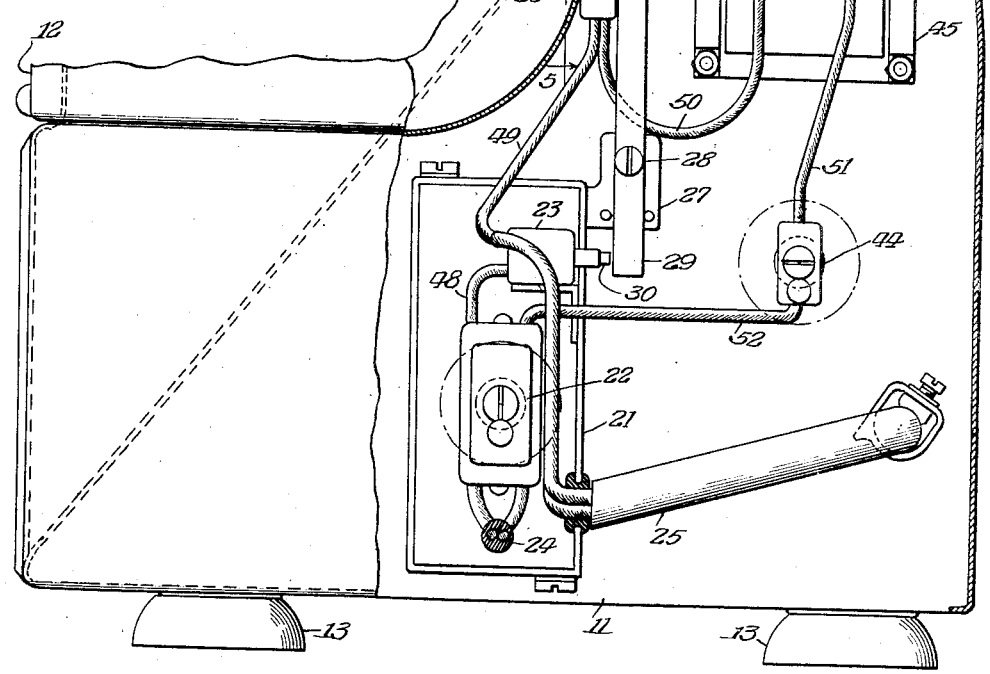
Inventor
Harry C. Pfister
By Spencer, Marzall, Johnston & Cook,
Attys Patented Mar. 23, 1948

2,438,184

UNITED STATES PATENT OFFICE 2,438,184

FOOD TENDERING MACHINE

Harry C. Pfister, Long Beach, Ind., assignor to U. S. Slicing Machine Company, La Porte, Ind., a corporation of Indiana Application June 16, 1944, Serial No. 540,669

4 Claims. (Cl. 99—253)

1

This invention relates to food tendering machines.

A principal object of the invention is to provide ultraviolet ray emitting apparatus in a food tendering machine to destroy any bacteria or other foreign organisms which might be lodged upon the food article being worked upon by the food tendering machine.

Another object of the invention is to provide a food tendering machine incorporating ultraviolet ray emitting apparatus adapted to flood the interior food receiving portions of the machine with ultraviolet rays, thereby to destroy any bacteria or foreign organisms which may become lodged upon or within portions of the machine proper.

A further object of the invention is to provide a food tendering machine wherein ultraviolet ray emitting means are directed to a food article being operated upon within said food tendering machine and are prevented from escaping from the food tendering machine through an opening in which the food article is inserted.

An additional object of the invention is to provide safety mechanism to prevent operation of the ultraviolet ray emitting apparatus whenever the cover of the food tendering machine is opened.

Still another object of the invention is to provide additional safety mechanism which prevents operation of the ultraviolet ray emitting apparatus even though the drive motor for the food tendering machine may be restarted when the cover is open.

Numerous other objects and advantages will be apparent throughout the progress of the following specification.

The accompanying drawings illustrate one embodiment of a device incorporating the features of the present invention, in which Fig. 1 is a front elevational view with some of the parts broken away for the sake of clearness;

Fig. 2 is a detail sectional view on the line 2—2 of Fig. 1;

Fig. 4 is a right elevational view with some of the parts broken away for the sake of clearness and illustrates an alternative embodiment of the present invention;

Fig. 5 is a detail sectional view on the line 5—5 of Fig. 4 with some of the parts broken away for the sake of clearness;

2

Figure 3:
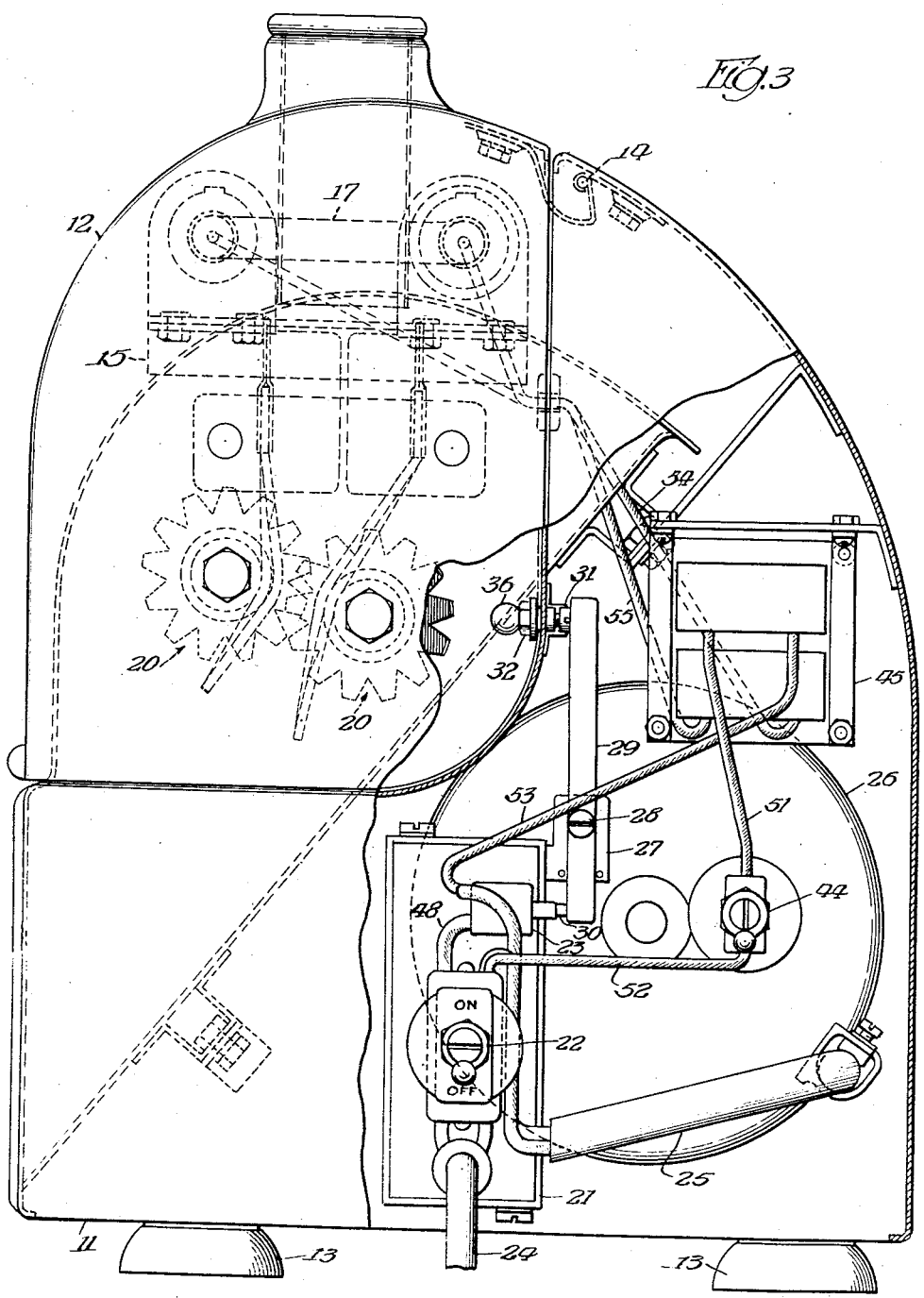
Fig. 3 is a right elevational view with some of the parts broken away for the sake of clearness.

Fig. 6 is a detail sectional view on the line 6—6 of Fig. 5; and

Fig. 7 is an electrical diagram of the alternative embodiment illustrated in Fig. 4.

The particular device herein disclosed for the purpose of illustrating the invention is shown in combination with a meat tendering machine of the type disclosed in a copending application made by Arthur H. Ahrndt, Serial No. 455,561, filed August 21, 1942 (issued as Patent No. 2,409,463, Oct. 15, 1946) and assigned to the assignee of the present application.

In tendering machines of this type, the entire operating mechanism ordinarily is supported by and mounted within a base 11 and a cover 12, the base and cover preferably being made of light metal stampings and configured to be pleasing to the eye. The resulting assembly of the base and cover may be supported upon a plurality of rubber mounting feet 13, and hinges 14 are provided to offer access to the operating parts of the machine.

A bracket 15 is provided within the right-hand side of the cover 12, and a bracket 16 within the left-hand side of the cover. These two brackets preferably are spot welded to the interior spaces of the cover and form a support for a U-shaped ultraviolet ray emitting tube 17, frequently referred to as a "Sterilamp." The Sterilamp 17 is mounted to the right-hand bracket 15 by a plurality of mounting screws 18, and the left-hand end of the Sterilamp is supported in suitably shaped recesses in the bracket 16. A U-shaped Sterilamp is selected so that the lamp may surround the food trough 19 of the food tendering machine. The Sterilamp 17 is mounted above the lower end of the food trough 19 so that none of the ultraviolet rays emitted by the Sterilamp may gain direct outlet through the food trough opening.

The operation of a food tendering machine contemplates the insertion of a food article in the food trough 19 from whence the food article passes between the knife assemblies 20 where it is tenderized. The position of the Sterilamp above the knife assemblies and the U-shape of the Sterilamp around the food trough 19 results in both sides of the food article being flooded with the rays from the Sterilamp when the food article passes from the trough 19 into the knife assemblies 20 and destroys any dangerous bacteria or similar organisms which may be lodged upon the food article. In addition, the rays from the Sterilamp flood the interior of the machine so as to destroy any bacteria or similar organisms therein, as for instance bacteria upon food particles which may have become lodged between the blades of the knife assemblies 20.

Occasionally it is necessary for the operator to open the cover 12 of the food tendering machine to gain access to the operating parts. When the cover is open, the ultraviolet rays from the Sterilamp will be free to escape from the housing of the machine. Since these rays possibly might be dangerous to the operator, either to his hands or eyes, or some other portion of his body, the Sterilamp is connected through a cover operated limit switch 23 which may be operated by any suitable mechanism, whereby it will be closed when the cover 12 is closed and opened when the cover 12 is opened. Occasionally such cover operated switches are used for the purpose of starting and stopping the operating mechanism of the food tendering machine, in which case one switch may be used to turn off both the Sterilamp and the operating motor when the cover is lifted. A copending application made by Hendrik Stukart, Serial No. 507,800, filed October 27, 1943, and assigned to the present assignee, discloses cover operated switch mechanism of the type which may be used for this purpose.

In the present embodiment, a switch housing 21 is secured to the inside of the right wall of the base 11 and provides a housing for an off-on toggle switch 22 and a limit switch 23. The toggle switch 22 is inserted between the power supply line 24 and the motor line 25 to the drive motor 26 of the food tendering machine. The limit switch 23 is placed in series with one of the wires from the toggle switch 22 to the motor line 25. The current supply to the Sterilamp is in parallel with the motor line 25. The toggle switch 22 is the main off-on switch of the machine, and the limit switch 23 is used as a cover operated safety switch. Opening either switch shuts off the current supply both to the Sterilamp and to the motor and stops operation of the food tendering machine.

A bracket 27 is secured to the rear of the switch housing 21 and is supplied with a fulcrum 28 for a switch operating lever 29. The lower end of the lever 29 contacts an operating finger 30 upon the limit switch 23. When the operating finger 30 is depressed toward the switch 23, the switch is closed. When the operating finger 30 is released, a spring, mounted within the housing of the limit switch 23, forces the operating finger 30 outwardly and opens the switch. As shown in Figs. 3 and 4, the operating finger 30 is urged inwardly when the lever 29 is moved in a clockwise direction and is released when the lever 29 is permitted to move in a counter-clockwise direction.

The lever 29 may be moved in its clockwise direction by an adjustable tappet 31 which is screwed into a nut 32. The nut 32 may be welded to a bracket 33 which is secured within the inner portion of the right-hand side of the cover. As the cover 12 is raised or lowered, it carries with it the tappet assembly. A ferrule 34 is placed around the shank of the tappet 31 so that the entire tappet assembly may be guided into a hole 35 in the base 11 of the food tendering machine. This ferrule tends to hold the cover rigid when it is closed.

The tappet 31 is adjusted so that when the cover is closed the tappet will urge the lever 29 in a clockwise direction sufficiently far to operate the finger 30 to close the limit switch 23. Opening of the cover 12 removes the tappet 31 from contact with the lever 29 and permits the internal spring within the limit switch 23 to move the finger 30 outwardly and to shift the lever 29 in a counter-clockwise direction, whereby the limit switch opens.

A hand control knob 36 may be moved to the right, Figs. 5 and 6, to manually shift the lever 29 in its clockwise direction to close the limit switch 23. The hand control knob 36 is provided with an extension which extends through a slot 38 in the base 11 and which is securely fastened to a slidable actuating block 39. The actuating block 39 is slidably mounted within a pair of brackets 40 and 41 which are secured to the base 11. This actuating block is provided with a ramp portion 42 which is adapted to contact the lever 29. Viewing Figs. 5 and 6, when the cover 12 is opened, the entire tappet assembly, including the tappet 31, will be removed from contact with the lever 29 and the lever will be permitted to move forwardly, thereby opening the limit switch 23. If, under these conditions, the hand knob 36 then is moved toward the right, the ramp 42 on the block 39 will urge the lever arm 29 rearwardly, thus closing the limit switch 23 and reconnecting the Sterilamp and the drive motor of the machine.

In order to prevent any harmful effects to the operator which might result from a relighting of the Sterilamp, a hand operated off-on switch 44 is provided in the primary circuit of the transformer 45 which provides the operating current for the Sterilamp. When the cover 12 is opened and the operator contemplates a restarting of the drive motor 26 through the operation of the hand control knob 36, the operator will first turn off the off-on switch 44 so that the Sterilamp 17 will not be relighted.

Occasionally the operator may forget to turn off the off-on switch 44 and may be injured accidentally when he restarts the machine with the cover open. To prevent this, an alternative toggle switch 46 may be inserted in the line 49, 50 from the limit switch 23 to the transformer 45. The toggle switch 46 is supported on the inside of the base 11 and is mounted below the block 39. The operating knob of the toggle switch 46 extends into an inverted U-shaped groove 47 on the lower side of the block 39. When the block 39 is in its left-hand position, the switch 46 is closed, and when the block 39 is moved to its right-hand position, the switch 46 will be opened. Accordingly, if the operator should move the hand control knob 36 to its right-hand position to close the limit switch 23, he will simultaneously open the toggle switch 46 so that no current will flow to the transformer 45.

The wiring diagram for the circuit which utilizes the additional toggle switch 46 is illustrated in Fig. 7. Current from the upper wire of the power supply line 24 goes through the upper element of the off-on toggle switch 22, the line 48, the limit switch 23, and one of the wires of the motor line 25, to the motor 26. Current returns to the line via the other wire of the motor line 25 and the lower element of the off-on toggle switch 22 to the lower wire of the power supply line 24. In addition, power is supplied to the Sterilamp through a circuit commencing with a wire 49 which receives its current from the limit switch 23. Current passes from the wire 49 through the toggle switch 46 and the wire 50 to one side of the primary of the transformer 45. The return from the other side of the primary of the transformer is by way of wire 51, the off-on switch 44 and wire 52 to the lower element of the off-on toggle switch 22. If it is not desired to take advantage of the additional safety afforded through the use of the toggle switch 46, the switch 46 and wires 49 and 50 may be removed and may be replaced by wire 53, as is shown in Fig. 3.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In a food tendering machine a movable cover, a drive motor, ultraviolet ray emitting means, switch mechanism operated by the cover and adapted to disconnect the drive motor and the ultraviolet ray emitting means from a source of electrical power when the cover is opened, and hand operated auxiliary mechanism operable when the cover is opened and adapted to reconnect the drive motor to the source of electrical power and to simultaneously disconnect the ultraviolet ray emitting means from the source of electrical power, said auxiliary mechanism including an auxiliary switch in the electrical circuit to the ultraviolet ray emitting means, said switch being mechanically connected with the hand operated mechanism.

2. In a food tendering machine having a motor, food tendering means driven by the motor, ultraviolet ray emitting means adapted to emit rays on the tendering means to destroy bacteria, a movable cover adapted to house the operating parts of the machine including the tendering means and the ray emitting means, switch mechanism operated by the cover, a motor circuit, a ray emitting means circuit, said switch mechanism including a mechanically operated switch means adapted to open both the motor and the ray emitting circuits when the cover is open, and manually operable switch means operable when the cover is open and adapted simultaneously to close the motor circuit and to open the ray emitting circuit whereby the motor may be permitted to run but the ray emitting means will be functionally ineffective when the cover is open.

3. In a food tendering machine having a movable cover, food tendering means beneath the cover, operating means to operate said food tendering means, ultraviolet ray emitting means for emitting rays on the tendering means to destroy bacteria, an electric circuit to control the operation of the operating means and the ray emitting means, a safety switch including mechanism operated by the cover to control said circuit, auxiliary mechanism adapted selectively to render said safety switch mechanism partially ineffective, said safety switch mechanism comprising a manually movable member being so positioned within the machine that access thereto may be gained only when the cover is opened, a second switch in said circuit, mechanical linkage between said movable member and said switches and adapted to open the first switch when the second switch is closed and to close said first switch when said second switch is opened, said first switch being closed at all times that the second switch is opened and closed by the cover operated mechanism.

4. In a food tendering machine having a movable cover, food tendering means and ultraviolet ray emitting means beneath the cover, an electric circuit controlling the operation of the tendering and emitting means, a safety switch in said circuit and including mechanism operated by the cover, auxiliary mechanism adapted selectively to render said safety switch mechanism partially ineffective, said safety switch mechanism comprising a manually movable member being so positioned within the machine that access thereto may be gained only when the cover is opened, a second switch in said circuit, mechanical linkage between said movable member and said switches and adapted to open the first switch whenever the second switch is closed by the manually movable member, but not to open the first switch when the second switch is closed by the mechanism operated by the cover, whereby the emitting means is inoperative when the cover is open regardless of the operation of the tendering means.

HARRY C. PFISTER.

REFERENCES CITED

The following references are of record in the file of this patent:

UNITED STATES PATENTS

| Number | Name | Date |
|---|---|---|
| 1,827,530 | LeGrand | Oct. 13, 1931 |
| 2,020,250 | Stephens | Nov. 5, 1935 |
| 2,145,196 | Biggs | Jan. 24, 1939 |
| 2,181,293 | Biggs | Nov. 28, 1939 |
| 2,189,279 | Bitner | Feb. 6, 1940 |
| 2,245,837 | Stoddard et al. | June 17, 1941 |
| 2,288,587 | Kalischer | June 30, 1942 |
| 2,346,686 | Jackson | Apr. 18, 1944 |